US010852250B1

(12) United States Patent
Mai

(10) Patent No.: US 10,852,250 B1
(45) Date of Patent: Dec. 1, 2020

(54) QUANTITATIVE TEST METHOD FOR STRIAE IN OPTICAL MATERIALS

(71) Applicant: China North Standardization Center, Beijing (CN)

(72) Inventor: Lyubo Mai, Beijing (CN)

(73) Assignee: China North Standardization Center, Beijing (CN)

(*) Notice: Subject to any disclaimer, the term of this patent is extended or adjusted under 35 U.S.C. 154(b) by 0 days.

(21) Appl. No.: 16/937,542

(22) Filed: Jul. 23, 2020

Related U.S. Application Data

(63) Continuation of application No. PCT/CN2019/108498, filed on Sep. 27, 2019.

(30) Foreign Application Priority Data

Sep. 28, 2018 (CN) .......................... 2018 1 1138838

(51) Int. Cl.
G01N 21/958 (2006.01)
G01N 21/88 (2006.01)
G06T 7/62 (2017.01)

(52) U.S. Cl.
CPC ....... *G01N 21/958* (2013.01); *G01N 21/8851* (2013.01); *G06T 7/62* (2017.01); *G01N 2021/8887* (2013.01); *G01N 2201/0631* (2013.01); *G01N 2201/127* (2013.01)

(58) Field of Classification Search
CPC .... G01N 21/958; G01N 21/8851; G06T 7/62; G06T 7/0012
See application file for complete search history.

(56) References Cited

U.S. PATENT DOCUMENTS 6,766,042 B2 * 7/2004 Freeman .................. A61B 3/13
348/78

FOREIGN PATENT DOCUMENTS

| CN | 1127037 A | 7/1996 |
| CN | 1646883 A | 7/2005 |
| CN | 201477055 U | 5/2010 |
| CN | 102288613 A | 12/2011 |

(Continued)

OTHER PUBLICATIONS

Feng Yan, He Ming-yi, Yu Hua-jing, Wei Jiang, "A Glass Uniformity Inspection System Based on Image Processing", (Journal of Computer Applications), vol. 24, No. (4), Apr. 30, 2004(Apr. 30, 2004), ISSN:1001-9081, pp. 64-66.

*Primary Examiner* — Bryan Bui
(74) *Attorney, Agent, or Firm* — Wayne & Ken, LLC; Tony Hom

(57) ABSTRACT

The present application relates to the measurement technology of the striae in optical materials, and more particularly to a quantitative test method for the striae in optical materials. The method includes: establishing a concept and algorithm of the striae quantitative expression; establishing a gray ruler of striae quantitative measurement and standard proof samples to calibrate a photoelectric projection measurement apparatus equipped with a photoelectric image sensor; imaging a measurement sample with the calibrated photoelectric projection measurement apparatus and obtaining the striae image of the measurement sample thereof and determining values of the parameters of the area and gray of the striae image; and inputting the values into the algorithm to calculate the striae value of the measurement sample.

7 Claims, 3 Drawing Sheets

(56) References Cited

FOREIGN PATENT DOCUMENTS

| | | |
|---|---|---|
| CN | 102680447 A | 9/2012 |
| CN | 202631434 U | 12/2012 |
| CN | 103245670 A | 8/2013 |
| CN | 108226188 A | 6/2018 |
| CN | 109342437 A | 2/2019 |
| JP | 2000132684 A | 5/2000 |
| JP | 2017053673 A | 3/2017 |

* cited by examiner

Mild　　　　Moderate　　　　Severe

QUANTITATIVE TEST METHOD FOR STRIAE IN OPTICAL MATERIALS

CROSS-REFERENCE TO RELATED APPLICATIONS

This application is a continuation of International Application No. PCT/CN2019/108498 with a filing date of Sep. 27, 2019, designating the United States, now pending, and further claims the benefit of priority from Chinese Patent Application No. 201811138838.1 with a filing date of Sep. 28, 2018. The content of the aforementioned applications, including any intervening amendments thereto, is incorporated herein by reference in its entirety.

TECHNICAL FIELD

The present application relates to the testing technical field of the striae in optical materials, and more particularly to a quantitative test method for striae in optical materials.

BACKGROUND OF THE INVENTION

The striae in optical materials are a phenomenon generally caused by sudden changes in an internal refractive index of the optical materials, which are a kind of material defect aroused by the problems in the melting technology and melting control process of optical materials. The striae of visible light materials can be observed by a projection optical system in FIG. 1 (or by a schlieren optical system). The striae in the optical materials usually look like irregular filaments or bands with a certain gray level, as shown in FIG. 2. The striae are formed at a position where a sudden change occurs in the refractive index (increasing or decreasing by $\Delta n$) relative to the refractive index of a substrate. FIG. 2 exemplarily shows the mild, moderate and severe striae defects, where the degree of the striae defects in the optical materials is positively related to the number, the area proportion and the gray level of the striae. The optical materials without striae are even and transparent. In the observation of the striae in optical materials, the projection optical system is only applicable to qualitative evaluation of the striae in the optical materials. Even using the schlieren optical system merely has access to the semi-quantitative measurement (only reflecting more uneven details in the striae). Neither of the two systems can be used to quantitatively measure the striae in the optical materials.

Whether in visible-light optical materials or in infrared optical materials, the striae are a severe defect in optical materials, which will seriously affect the imaging quality of optical parts. Therefore, it is urgently expected in optical material field to quantitatively measure the striae in the optical materials. If the striae defects of the optical materials can be quantitatively tested, materials of the optical parts can be reasonably selected for the optical systems with different image quality requirements (in spite of the presence of a few striae), thereby ensuring the imaging quality of the optical systems. In addition, the quantitative test of the striae defects can also guide the improvement of the melting process of the optical materials, thereby improving the quality of the optical materials. Therefore, how to quantitatively test the striae in the optical materials has been being a technical problem required to be solved urgently.

Currently, there are only two test methods for the striae in the optical materials, i.e., a qualitative projection method and a semi-quantitative schlieren method. However, neither of the two methods can be used to quantitatively test the striae. Actually the so-called semi-quantitative schlieren method also cannot give quantificationally expressing values, and only displays more striae image details than the projection method.

Striae grade is often used as an indicator for the qualitative evaluation of striae, and is divided into A, B, and D levels. The striae level of a sample is determined by human eye visual perception of the striae images. Since there is no accurate quantitative index for determining the boundaries among the levels and the test results are mainly determined by the subjective sensation of observers. Therefore those test methods are lack of objectivity and accuracy in the evaluation of the striae level, and those results are difficult to truly and accurately reflect an effect of the striae on the optical system, failing to provide a reliable quantitative expression of the striae defects for the design of optical systems.

SUMMARY OF THE INVENTION

The object of the invention is to design a quantitative test method for the measurement of the striae in optical materials to solve the problems in the prior art that there are lack of quantitative test and objective evaluation for the striae defects in visible-light and infrared optical materials, facilitating the reasonable selection of a material to ensure the design quality of the optical systems and ensuring the melting quality of the optical materials.

The technical solutions of the invention are specifically described as follows.

The present invention provides a quantitative test method for striae in optical materials, comprising:

(1) establishing an index "striae value" for the quantitative expression of the striae in the optical materials; and establishing an algorithm of the striae value according to expression forms of the striae in optical materials and influencing factors of optical performance of the optical materials; wherein the algorithm is shown as follows:

$$S = \frac{\sum_{j=1}^{m}\sum_{i=1}^{n}\Delta g_{ji}}{n} \times \frac{\sum_{j=1}^{m} a_j}{Ad} = \Delta g_m \frac{\sum_{j=1}^{m} a_j}{Ad};$$

wherein S is the striae value;

i is a sequence number of gray pixel cells in a striae image of a measurement sample;

$\Delta g_i$ is a gray value of the $i^{th}$ gray pixel cell in the striae image of the measurement sample;

$\Delta g_m$ is an average gray value of the gray pixel cells in the striae image of the measurement sample;

n is a total number of the gray pixel cells in the striae image of the measurement sample;

j is a sequence number of striae in the striae image of the measurement sample;

$a_j$ is an area of the $j^{th}$ striae in the striae image of the measurement sample;

m is a total number of striae in the striae image of the measurement sample;

A is a total area of the striae image of the measurement sample; and d is a thickness of the measurement sample;

the striae value is a product of an average gray level of the striae and a percentage of the total area of the striae per thickness of the measurement sample;

(2) constructing a photoelectric projection measurement apparatus which comprises a parallel light source system, the measurement sample, a first positive lens, a second positive lens and an image sensor along the direction of an optical axis sequentially, wherein a sample stage is provided to carry the measurement sample;

(3) setting a gray ruler of light energy response for detection elements within a dynamic range of the image sensor of the photoelectric projection measurement apparatus, wherein the number of gray levels of the gray ruler is determined according to an expected measurement accuracy;

(4) making standard proof samples for calibrating the photoelectric projection measurement apparatus, wherein the standard proof samples are respectively a zero-gray standard proof sample, a medium-gray standard proof sample, a 25%-gray standard proof sample and a 75%-gray standard proof sample; the zero-gray standard proof sample is a standard proof sample without any striae defects inside; the medium-gray standard proof sample is a standard proof sample with a medium-gray (a 50%-gray standard proof sample) in relation to the possible maximum-gray of the striae, and the medium-gray standard proof sample is used to calibrate the photoelectric projection measurement apparatus based on 50% gray value; all the standard proof samples share the same thickness, and are the same as the measurement sample in material mark or glass mark;

(5) manufacturing the measurement sample to have the same thickness as the standard proof samples; and (6) calibrating the photoelectric projection measurement apparatus with the standard proof samples prepared in step (4); imaging the measurement sample with the calibrated photoelectric projection measurement apparatus to measure the parameters of the area and gray of the striae image mentioned in step (1) thereof; and calculating the measured results with the formula established in step (1) to obtain the striae value of the measurement sample.

In an embodiment, in step (2), the photoelectric projection measurement apparatus sequentially comprises the parallel light source system, the sample to be measure, a negative lens, a diaphragm, a positive lens and the image sensor along the direction of an optical axis.

In an embodiment, in step (3), there are 32 gray levels for a low accuracy, 64 gray levels for a medium accuracy and 128 or 256 gray levels for a high accuracy; and the range of each gray levels, such as a low accuracy, a medium accuracy and a high accuracy, is a preset value, which can be changed according to measurement accuracy requirements.

In an embodiment, step (6) comprises:

(6.1) imaging the zero-gray standard proof sample with the photoelectric projection measurement apparatus to obtain an image of the zero-gray standard proof sample, which is used to calibrate the image sensor of the photoelectric projection measurement apparatus; wherein the image of the zero-gray standard proof sample is used to calibrate the maximum brightness state of the image sensor, or a zero-gray state;

(6.2) imaging the medium-gray standard proof sample with the photoelectric projection measurement apparatus to obtain an image of the medium-gray standard proof sample, which is used to calibrate the image sensor of the photoelectric projection measurement apparatus thereof; wherein the image of the medium-gray standard proof sample is used to calibrate 50% of the maximum-gray value of the image sensor;

(6.3) performing a zero-gray calibration on the gray ruler of the image sensor based on a reference value corresponding to the maximum brightness state in step (6.1); and performing a 50% gray calibration on the gray ruler of the image sensor based on a reference values corresponding to the 50% gray obtained in step (6.2); and (6.4) measuring the measurement sample with the photoelectric projection measurement apparatus which has been calibrated by the standard proof samples to obtain the striae image of the measurement sample; determining the parameters of the striae image mentioned in step (1) by a data collecting, processing and displaying system; inputting the determined parameters into the formula established in step (1) to calculate the striae value of the measurement sample; and outputting the striae image of the measurement sample and the striae value.

In an embodiment, when in step (6.1), in the power-on measurement process, a brightness value higher than that of the zero-gray is treated by saturation, or regarded as the zero-gray.

In an embodiment, step (6.2) and step (6.3) further comprise:

calibrating the image sensor with the 25%-gray standard proof sample and the 75%-gray standard proof sample respectively to obtain a precise calibration for the image sensor.

In an embodiment, the quantitative measurement result is an absolute quantitative measurement result of the striae in the optical materials or a relative quantitative measurement result of the striae in the optical materials.

Compared to the prior art, the invention has the following beneficial effects.

The invention provides a quantitative test method for striae in optical materials, in which a concept and an algorithm of the striae quantification expression are established; a series of standard proof samples with gray and a gray ruler of received signals are established to calibrate a photoelectric projection measurement apparatus equipped with a photoelectric image sensor; a measurement sample is imaged with the calibrated photoelectric projection measurement apparatus to obtain a striae image; the striae image is analyzed via the photoelectric projection measurement apparatus to obtain values of the related parameters; and the values are plugged into an algorithm to obtain a quantitative expression value of the striae defects of the measurement sample. With regard to the measure results of the striae in the optical materials, the invention replaces the conventional manual qualitative evaluation with an automatic quantification evaluation using the photoelectric projection measurement apparatus according to the striae algorithm, which not only greatly improves the accuracy and objectivity of the measurement, but also greatly improves the measurement efficiency, achieving the output of the striae measurement image and the output of the striae quantification measurement results simultaneously.

DETAILED DESCRIPTION OF EMBODIMENTS

In order to make objects, contents and advantages of the present invention clearer, the invention will be further described in detail below with reference to the accompanying drawings and embodiments.

The invention establishes a concept of striae value and an algorithm of striae quantification expression; designs characteristics of a series of standard proof samples for measurement apparatus calibration; establishes a calibration method and an error correction analysis method for the striae quantitative measurement involving the measurement of a photoelectric projection measurement apparatus, and applies the photoelectric projection measurement apparatus to perform measurements according to the following steps.

(1) An index "striae value" for the quantitative expression of the striae in the optical materials is established; and an algorithm of the striae value is established according to expression forms of the striae in the optical materials and the influencing factors of optical performance of optical materials; where the algorithm is shown as follows:

$$S = \frac{\sum_{j=1}^{m}\sum_{i=1}^{m}\Delta g_{ji}}{n} \times \frac{\sum_{j=1}^{m} a_j}{Ad} = \Delta g_m \frac{\sum_{j=1}^{m} a_j}{Ad};$$

where S is the striae value;

i is a sequence number of gray pixel cells in a striae image of a measurement sample;

$\Delta g_i$ is a gray value of the $i^{th}$ gray pixel cell in the striae image of the measurement sample;

$\Delta g_m$ is an average gray value of the gray pixel cells in the striae image of the measure sample;

n is a total number of the gray pixel cells in the striae image of the measurement sample;

j is a sequence number of striae in the striae image of the measurement sample;

$a_j$ is an area of the $j^{th}$ striae in the striae image of the measurement sample;

m is a total number of striae in the striae image of the measurement sample;

A is a total area of the striae image of the measurement sample; and d is a thickness of the measurement sample;

the stria value is a product of an average gray level of the striae and a percentage of the total area of the striae per thickness of the measurement sample;

$$\sum_{i=1}^{n} \Delta g_{ji}$$

is a sum of the gray values of the detection elements in each of the striae, where the gray values of the detection elements in various striae are different. This algorithm regards the main factors affecting an imaging quality of an optical system as the key factors for quantitative calculation, where the key factors are an area of the striae and gray value of the striae. In addition, calculation results among the samples to be measured are comparably calculated, that is, the gray value of the striae are compared with an average gray value, and the area of the striae and the gray value are compared according to a per thickness of the measurement sample. This algorithm makes measurement quantitative values of the measurement sample comparable in magnitude.

Figure 1:
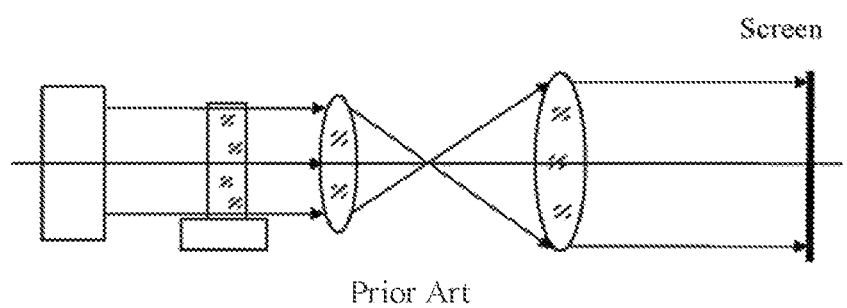
FIG. 1 schematically shows a visible light projection optical system in the prior art.
Figure 2:
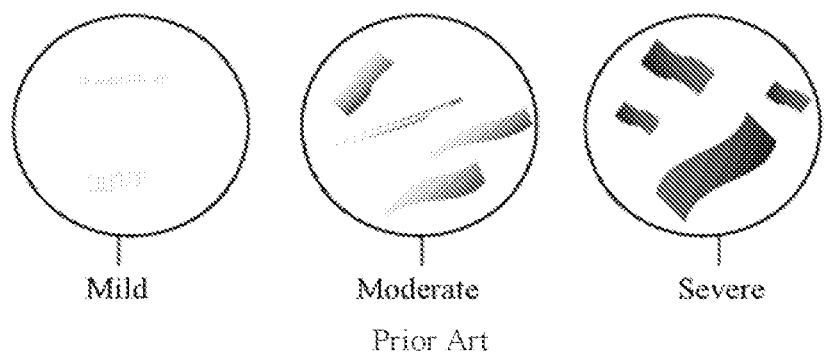
FIG. 2 shows striae of different gray levels in optical materials.

(2) Quantitative measurement of the striae in the optical materials cannot be displayed by a screen shown in FIG. 1 (whether using a projection method or a schlieren method), so an image sensor is required for receiving the images projected from the measurement sample and processing subtle data of the striae in the samples to be measured (it is impossible for human to finely process the images) to achieve quantitative measurement. Therefore, the measurement apparatus for the striae quantitative measurement must be a kind of the photoelectric projection measurement apparatus with a photoelectric image sensor to receive striae image signals, that is, the photoelectric projection measurement apparatus is used to replace the screen projection measurement apparatus to perform the quantitative measurement of the striae, so that measure images can be calibrated, analyzed, calculated and stored.

Figure 3:
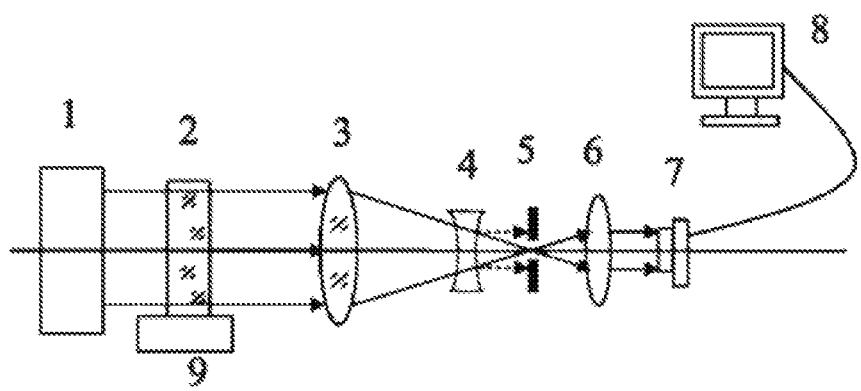
FIG. 3 shows a photoelectric projection measurement apparatus according to the present invention.

Therefore, as shown in FIG. 3, the photoelectric projection measurement apparatus is constructed, in which a parallel light source system 1, the measurement sample 2, a first positive lens 3, a negative lens 4, a diaphragm 5, a second positive lens 6, an image sensor 7, and a data collecting, processing and displaying system 8 are sequentially placed along the direction of an optical axis. A sample stage 9 is configured to carry the measurement sample 2. The negative lens 4 and its matched diaphragm 5 are interchangeable with the second positive lens 6, and only one of them is required, so that one of them can form a projection optical system together with the first positive lens 3, where the photoelectric projection measurement apparatus using the negative lens 4 will occupy a smaller space. However, if the negative lens 4 is used, the diaphragm 5 that limits stray light cannot be added, so that the photoelectric projection measurement apparatus will be affected by a certain amount of stray light, thereby affecting an accuracy of the quantitative measurements. Therefore, in the case that there is no space limitation of the measure apparatus, it is preferable to use a matching scheme of the projection optical system in which the first positive lens 3 and the second positive lens 6 are combined.

(3) A gray ruler of light energy response for detection elements within a dynamic range of the image sensor 7 of the photoelectric projection measurement apparatus is set, where the number of gray levels of the gray ruler is determined according to an expected measurement accuracy. For example, there are 32 gray levels for a low accuracy, 64 gray levels for a medium accuracy and 128 or 256 gray levels for a high accuracy; and the range of each gray levels, such as a low accuracy, a medium accuracy and a high accuracy, is a preset value, which can be changed according to measurement accuracy requirements.

Figure 4:
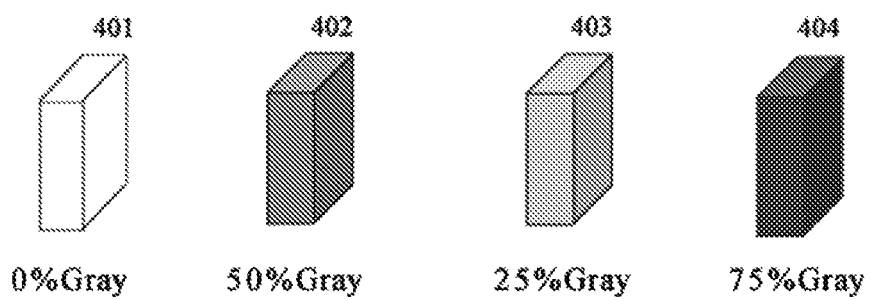
FIG. 4 schematically shows standard proof samples for the photoelectric projection measurement apparatus according to the present invention.

(4) Standard proof samples are made for calibrating the photoelectric projection measurement apparatus to ensure the accuracy and the comparability of the measure results of the measurement sample. As shown in FIG. 4, the standard proof samples include a zero-gray standard proof sample 401, a medium-gray standard proof sample 402, a 25%-gray standard proof sample 403, and a 75%-gray standard proof sample 404. the zero-gray standard proof sample is a standard proof sample without any striae defects inside; the medium-gray standard proof sample is a standard proof sample with a medium-gray in relation to a maximum-gray of the striae, and the medium-gray standard proof sample is used to calibrate the photoelectric projection measurement apparatus based on 50% gray value; the standard proof samples share the same thickness, and are the same as the measurement sample in material mark or glass mark. When performing a quantitative measurement of the striae in the optical materials with a low accuracy requirement, only the zero-gray standard proof sample 401 and the medium-gray standard proof sample 402 are used to calibrate the photoelectric projection measurement apparatus. When performing a quantitative measurement with a high accuracy measurement, the 25%-gray standard proof sample 403 and the 75%-gray standard proof sample 404 are also added to calibrate the photoelectric projection measurement apparatus.

(5) The measurement sample 2 is manufactured to have the same thickness and other trait as the standard proof samples.

(6) Calibration and measurement for the quantitative measurements of the striae in optical materials are described as follows.

(6.1) The zero-gray standard proof sample 401 in FIG. 4 is imaged with the photoelectric projection measurement apparatus to obtain an image of the zero-gray standard proof sample, which is used to calibrate the image sensor of the photoelectric projection measurement apparatus; where the image of the zero-gray standard proof sample is used to calibrate the maximum brightness state of the image sensor, or a zero-gray state (in a measurement of the sample 2, brightness values larger than zero-gray are treated as saturation, or as zero-gray).

(6.2) The medium-gray standard proof sample 402 is imaged with the photoelectric projection measurement apparatus to obtain an image of the medium-gray standard proof sample, which is used to calibrate the image sensor of the photoelectric projection measurement apparatus; where the image of the medium-gray standard proof sample is used to calibrate 50% of the maximum-gray value of the image sensor.

Figure 5:
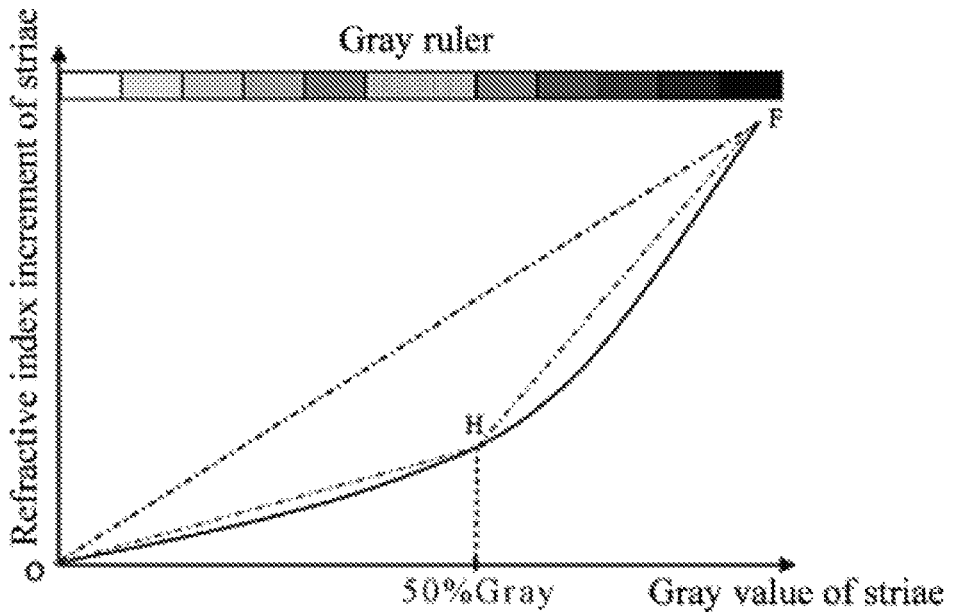
FIG. 5 schematically shows a gray value linearization correction relationship based on a two-point calibration in the striae quantification according to the present invention.

(6.3) The gray ruler of the image sensor 7 is subjected to a zero-gray calibration based on a reference value corresponding to the maximum brightness state obtained in step (6.1), and then is subjected to a 50% gray calibration based on a reference values corresponding to the 50% gray obtained in step (6.2) (the above steps are referred to a two-point calibration). These calibrations linearly improve the nonlinear relationship between the gray value measured by image sensor 7 and a refractive index of the striae of the measurement sample 2 well. As shown in FIG. 5, the gray ruler of the image sensor 7 before calibration is a slope straight line OF, and the gray value relationship of the refractive index increment of the striae is a curve OF, where the two lines have a very large error; the gray ruler of the image sensor 7 after calibrated can be divided into two slope straight lines OH and HF, and their corresponding gray curves of the refractive index increments of the striae are curves OH and HF. Obviously, the difference between straight lines OH and HF and curves OH and HF are small. The gray ruler of the image sensor 7 is calibrated with the standard proof samples, so that the gray value measured by the image sensor 7 is very close to an actual result, thereby greatly reducing a nonlinear error of the measurement.

Figure 6:
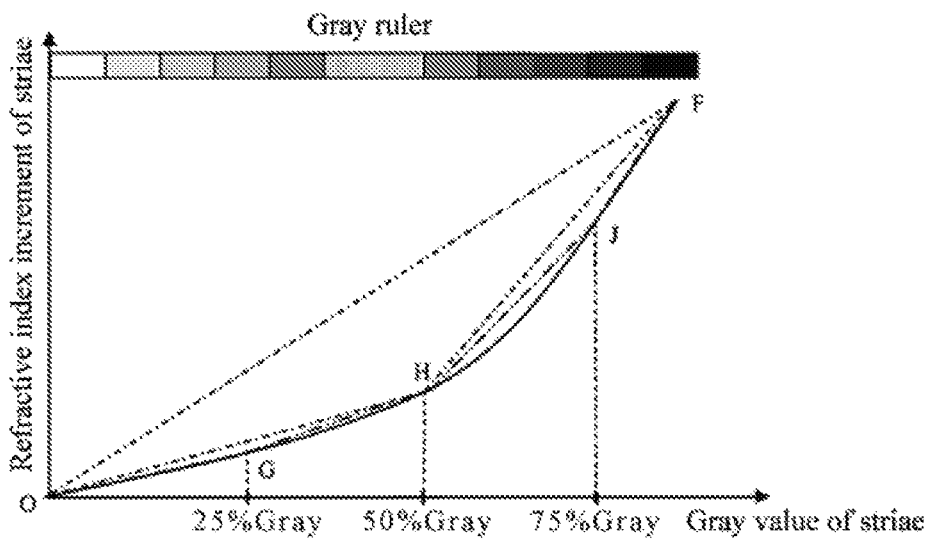
FIG. 6 schematically shows a gray value linearization correction relationship based on a four-point calibration in the striae quantification.

In addition to the zero-gray standard proof sample 401 and the medium-gray standard proof sample 402 for calibration, if the 25%-gray standard proof sample and the 75%-gray standard proof sample are also added to calibrate the image sensor 7, the measure results will have a better linear relationship. As shown in FIG. 6, the gray ruler of the image sensor 7 is divided into four slope straight lines OG, GH, HJ, and JF, and their corresponding gray curves of the refractive index increments of the striae are curves OG, GH, HJ, and JF. Obviously, the differences between the straight lines OG, GH, HJ, and JF and the curves OG, GH, HJ, and JF are much smaller than that in the two-point calibration. At this time, the straight line and the curve almost coincide, so that the gray value measured by the image sensor is closer to the actual result.

(6.4) After the photoelectric projection measurement apparatus has been calibrated with the standard proof samples, the measurement sample 2 is subjected to power-on measurement with the photoelectric projection measurement apparatus to obtain the striae image of the measurement sample, and the area and the gray value of the striae in the measure image are determined by the data collecting, processing, and displaying system 8. The determined parameters are inputted into the formula established in step (1) to calculate and obtain the striae value of the striae quantitative expression of the measurement sample, and the striae image of the measurement sample and the striae value are outputted.

There are two possible test results in the above measurements: one is an absolute quantitative result of the striae in the optical materials (an absolute quantitative striae value), and the other is a relative quantitative measurement result of the striae in the optical materials (a relative quantitative striae value). When the refractive index increment $\Delta n$ corresponds to the gray value increment of the standard proof samples, the measure result is the absolute quantitative result. Otherwise, the measure result is the relative quantitative result. In the actual application, the relative quantitative measurement can meet the needs of the image quality control in the design of the optical system and the quality control during the melting of the optical materials in most cases. Although the absolute quantitative measurement is preferred, the standard proof samples for absolute quantitative measurement have a relatively high cost.

It can be seen that the test method of the present invention achieves the quantification of the striae defects in the optical materials rather than just qualification, which not only makes the measurement and the evaluation of the striae accurate to provide a precise, accurate and objective reference for the material quality classification, but also achieves the comparison of the striae defects between the optical materials (in the absence of the quantitative measurement of the striae value, the comparison made between different samples with respect to the striae shape and gray level is inconvincible, and the comparison is distinct only when the striae defects of the samples have a huge difference).

In terms of the measure results of the striae in the optical materials, the invention replaces the traditional manual evaluation with an automatic calculating quantification by the photoelectric projection measurement apparatus according to the algorithm of the striae value, which not only greatly improves the measurement accuracy and objectivity, but also greatly improves the measurement efficiency, achieving the simultaneous outputting of the striae image and the quantification results, avoiding the consumption of time to manually grade the striae image and eliminating the dilemma of human determination in the boundary state (although this boundary requirement is very rough).

The quantification of the striae in the optical materials can be used not only improve the melting quality of the optical materials (the quantification result can be used to determine the response sensitivity and magnitude of the striae defect changes caused by changes in the various stages of the melting process to provide a reference for the process improvement), but also provide a reference of the quantification for the fine image quality design of the optical system.

The quantitative test method for the striae in the optical materials of the present invention not only can be applied to the quantitative measurements of striae in the visible light optical materials, the infrared optical materials, etc., but also can be applied to the quantitative measurement of gas and liquid moving fields in a uniform state to provide a quantitative evaluation result for the unevenness of the instantaneous refractive index of the gas and liquid moving fields (at least the relative quantitative evaluation result). The measurement method of the present invention can also be applied to a precise quantitative comparison for the uniform states of the gas and liquid moving fields at different times.

Described above are only preferred embodiments of the present invention. It should be noted that any improvement and variation made by those skilled in the art without departing from the spirit of the present invention shall fall within the protecting scope of the present invention defined by the appended claims.

What is claimed is:

1. A quantitative test method for striae in optical materials, comprising:
   (1) establishing an index "striae value" for the quantitative expression of the striae in the optical materials; and establishing an algorithm of the striae value according to expression forms of the striae in optical materials and influencing factors of optical performance of the striae in optical materials; wherein the algorithm is shown as follows:

$$S = \frac{\sum_{j=1}^{m}\sum_{i=1}^{m}\Delta g_{ji}}{n} \times \frac{\sum_{j=1}^{m}a_j}{Ad} = \Delta g_m \frac{\sum_{j=1}^{m}a_j}{Ad};$$

wherein S is the striae value;
   i is a sequence number of gray pixel cells in a striae image of a measurement sample;
   $\Delta g_i$ is a gray value of the $i^{th}$ gray pixel cell in the striae image of the measurement sample;
   $\Delta g_m$ is an average gray value of the gray pixel cells in the striae image of the measurement sample;
   n is a total number of the gray pixel cells in the striae image of the measurement sample;
   j is a sequence number of striae in the striae image of the measurement sample;
   $a_j$ is an area of the $j^{th}$ striae in the striae image of the measurement sample;
   m is a total number of striae in the striae image of the measurement sample;
   A is a total area of the striae image of the measurement sample; and
   d is a thickness of the measurement sample;
   the stria value is a product of an average gray level of the striae and a percentage of the total area of the striae per thickness of the measurement sample;
   (2) constructing a photoelectric projection measurement apparatus which comprises a parallel light source system, the measurement sample, a first positive lens, a second positive lens and an image sensor successively along the direction of an optical axis; wherein a sample stage is provided to carry the measurement sample;
   (3) setting a gray ruler of light energy response for detection elements within a dynamic range of the image sensor of the photoelectric projection measurement apparatus, wherein the number of gray levels of the gray ruler is determined according to an expected measurement accuracy, there are 32 gray levels for a low accuracy, 64 gray levels for a medium accuracy and 128 or 256 gray levels for a high accuracy; and the range of each gray levels is a preset value, which can be changed according to measurement accuracy requirements;
   (4) making standard proof samples for calibrating the photoelectric projection measurement apparatus, wherein the standard proof samples are respectively a zero-gray standard proof sample, a medium-gray standard proof sample, a 25%-gray standard proof sample and a 75%-gray standard proof sample; the zero-gray standard proof sample is a standard proof sample without any striae defects inside; the medium-gray standard proof sample is a standard proof sample with a medium-gray (a 50% gray standard proof sample) in relation to the possible maximum-gray of the striae, and the medium-gray standard proof sample is used to calibrate the photoelectric projection measurement apparatus based on 50% gray value; all the standard proof samples share the same thickness, and are the same as the measurement sample in material mark or glass mark;
   (5) manufacturing the measurement sample to have the same thickness as the standard proof samples; and
   (6) calibrating the photoelectric projection measurement apparatus with the standard proof samples prepared in step (4); imaging the measurement sample with the calibrated photoelectric projection measurement apparatus to measure parameters of the area and gray of the striae image mentioned in step (1); and calculating the measured results with the formula established in step (1) to obtain the striae value of the measurement sample.

2. The quantitative test method of claim 1, wherein in step (2), the photoelectric projection measurement apparatus sequentially comprises a parallel light source system, the measurement sample, a negative lens, a diaphragm, a positive lens and the image sensor along the direction of an optical axis.

3. The quantitative test method of claim 1, wherein in step (3), the range of each gray levels is a preset value, which can be changed according to measurement accuracy requirements.

4. The quantitative test method of claim 1, wherein step (6) comprises:
   (6.1) imaging the zero-gray standard proof sample with the photoelectric projection measurement apparatus to obtain an image of the zero-gray standard proof sample, which is used to calibrate the image sensor of the photoelectric projection measurement apparatus; wherein the image of the zero-gray standard proof sample is used to calibrate the maximum brightness state of the image sensor, or a zero-gray state;
   (6.2) imaging the medium-gray standard proof sample with the photoelectric projection measurement apparatus to obtain an image of the medium-gray standard proof sample, which is used to calibrate the image sensor of the photoelectric projection measurement apparatus thereof, wherein the image of the medium-gray standard proof sample is used to calibrate 50% of the maximum-gray value of the image sensor;
   (6.3) performing a zero-gray calibration on the gray ruler of the image sensor based on a reference value corresponding to the maximum brightness state in step (6.1); and performing a 50% gray calibration on the gray ruler of the image sensor based on two reference values corresponding to the 50% gray obtained in step (6.2); and (6.4) performing power-on measurement on the measurement sample with the photoelectric projection measurement apparatus which has been calibrated by the standard proof samples to obtain the striae image of the measurement sample; determining the parameters of the striae image mentioned in step (1) by a data collecting, processing and displaying system; inputting the determined parameters into the formula established in step (1) to calculate the striae value of the measurement sample; and outputting the striae image of the measurement sample and the striae value.

5. The quantitative test method of claim 4, wherein in step (6.1), in the power-on measurement process, a brightness value higher than that of the zero-gray is treated by saturation, or regarded as the zero-gray.

6. The quantitative test method of claim 4, wherein step (6.2) and step (6.3) further comprise:

calibrating the image sensor with the 25%-gray standard proof sample and the 75%-gray standard proof sample respectively to obtain a precise calibration for the image sensor.

7. The quantitative test method of claim 1, wherein the quantitative measurement result is an absolute or a relative quantitative measurement result of the striae in the optical materials.

* * * * *